(12) United States Patent
Dunphy et al.

(10) Patent No.: US 11,156,699 B2
(45) Date of Patent: Oct. 26, 2021

(54) MULTILAYER OPTICAL DEVICES AND SYSTEMS

(71) Applicant: Waymo LLC, Mountain View, CA (US)

(72) Inventors: James Dunphy, San Jose, CA (US); David Hutchison, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 60 days.

(21) Appl. No.: 16/667,686

(22) Filed: Oct. 29, 2019

(65) Prior Publication Data

US 2021/0124023 A1 Apr. 29, 2021

(51) Int. Cl.
*G01N 21/00* (2006.01)
*G01S 7/481* (2006.01)
(Continued)

(52) U.S. Cl.
CPC ........ *G01S 7/4818* (2013.01); *G02B 6/12002* (2013.01); *G01S 17/06* (2013.01); *G01S 17/88* (2013.01); *G02B 2006/12104* (2013.01)

(58) Field of Classification Search
CPC ........... G01M 11/3145; G01M 11/335; G01M 11/33; G01M 11/3109; G01M 11/338
(Continued)

(56) References Cited

U.S. PATENT DOCUMENTS 6,785,447 B2   8/2004  Yoshimura et al.

7,024,066 B1 *  4/2006  Malendevich ......... G02B 6/122
                                                            356/614
(Continued)

FOREIGN PATENT DOCUMENTS

KR  10-2018-0010476 A      1/2018
WO  WO-2011110070 A1 *  9/2011  .......... G02B 6/4215
WO     2017189863 A1     11/2017

OTHER PUBLICATIONS

Hiramatsu et al., "Three-Dimensional Waveguide Arrays for Coupling Between Fiber-Optic Connectors and Surface-Mounted Optoelectronic Devices," Journal of Lightwave Technology, vol. 23, No. 9, Sep. 2005, pp. 2733-2739, IEEE.
(Continued)

*Primary Examiner* — Md M Rahman
(74) *Attorney, Agent, or Firm* — McDonnell Boehnen Hulbert & Berghoff LLP

(57) ABSTRACT

One example system comprises a plurality of substrates disposed in an overlapping arrangement. The plurality of substrates includes at least a first substrate and a second substrate. The system also comprises a first waveguide disposed on the first substrate to define a first optical path on the first substrate. The first waveguide is configured to guide light along the first optical path and to transmit, at an output section of the first waveguide, the light out of the first waveguide toward the second substrate. The system also comprises a second waveguide disposed on the second substrate to define a second optical path on the second substrate. An input section of the second waveguide is aligned with the output section of the first waveguide to receive the light transmitted by the first waveguide. The second waveguide is configured to guide the light along the second optical path.

23 Claims, 12 Drawing Sheets

(51) Int. Cl.
  *G02B 6/12*   (2006.01)
  *G01S 17/06*  (2006.01)
  *G01S 17/88*  (2006.01)

(58) Field of Classification Search
  USPC ........................................................ 356/73.1
  See application file for complete search history.

(56) References Cited

U.S. PATENT DOCUMENTS

| | | |
|---|---|---|
| 8,190,030 B2 | 5/2012 | Leclair et al. |
| 8,977,082 B2 | 3/2015 | Singh et al. |
| 2003/0218119 A1* | 11/2003 | Stegmuller ......... H01S 5/06256 250/214.1 |
| 2004/0017215 A1* | 1/2004 | Mule .................... G01R 31/311 324/754.06 |
| 2007/0132467 A1* | 6/2007 | Jager .................... G01R 31/311 324/754.07 |
| 2014/0099054 A1 | 4/2014 | Black et al. |
| 2014/0286019 A1* | 9/2014 | Araki .................... F21V 14/003 362/311.09 |
| 2016/0109659 A1 | 4/2016 | Jiang |
| 2018/0156971 A1 | 6/2018 | Droz et al. |
| 2019/0250335 A1 | 8/2019 | Kulick et al. |

OTHER PUBLICATIONS

Search Report and Written Opinion for PCT/US2020/057390 dated Feb. 15, 2021.

\* cited by examiner

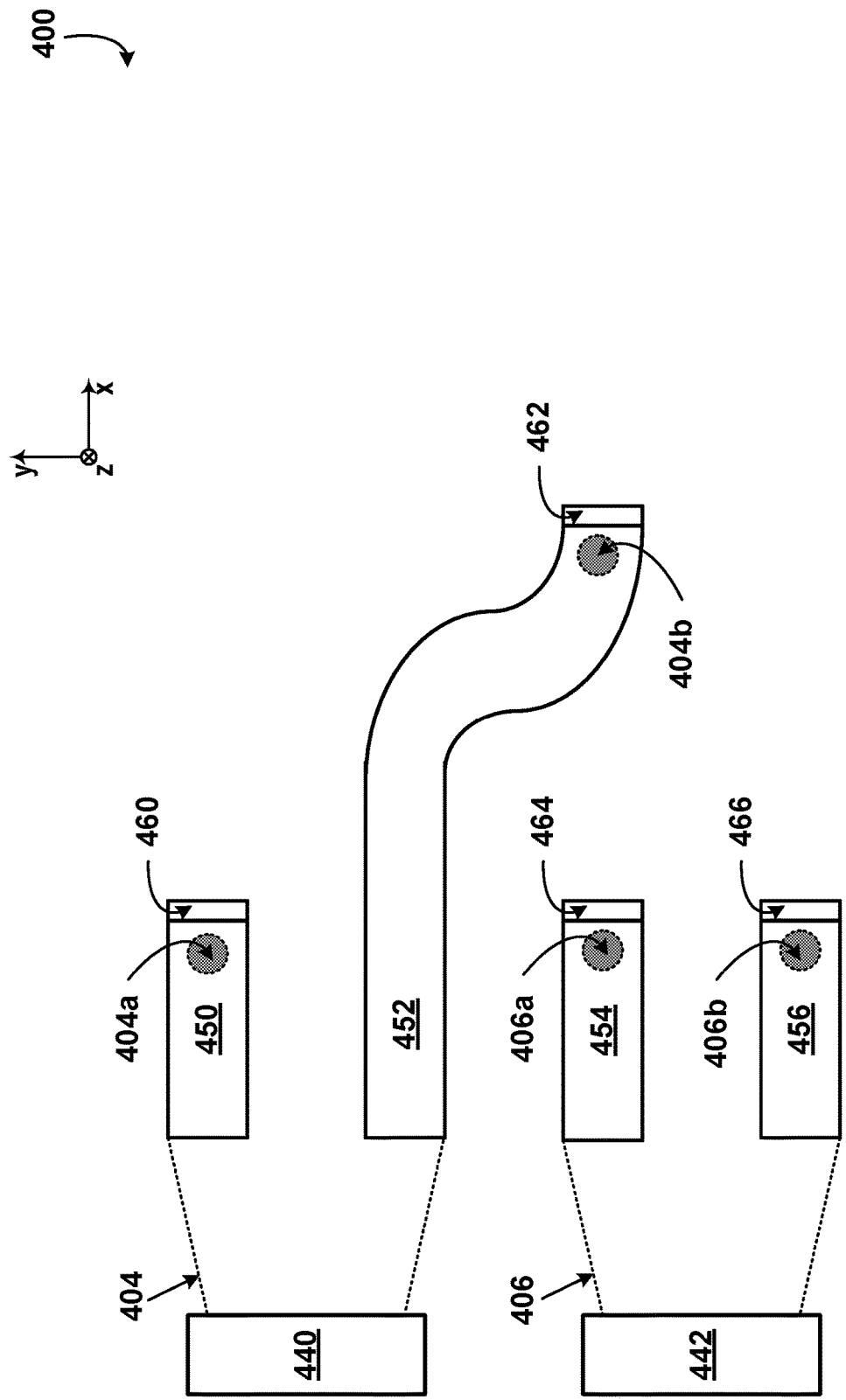

MULTILAYER OPTICAL DEVICES AND SYSTEMS

BACKGROUND

Unless otherwise indicated herein, the materials described in this section are not prior art to the claims in this application and are not admitted to be prior art by inclusion in this section.

Optical waveguides can be used in a variety of systems, such as medical devices, manufacturing systems, and remote sensing devices (e.g., LIDARs, etc.), among other examples. In general, an optical waveguide is a device that defines an optical path for guiding an optical signal from one spatial position (where the signal enters the waveguide) to another spatial position (where the signal exits the waveguide). In one example, an optical waveguide may include an optical material having a higher refractive index relative to its surrounding medium. Due to the difference between the refractive indexes, light propagating inside the optical material (or portions thereof) may reflect at one or more walls of the optical material back into the optical material (e.g., total internal reflection (TIR)) and then continue propagating inside the optical material. Thus, depending on a shape and/or other physical properties of the optical material, the optical waveguide may define a specific optical path for optical signals guided therein.

SUMMARY

In one example, a system comprises a plurality of substrates disposed in an overlapping arrangement. The plurality of substrates includes at least a first substrate and a second substrate. The system also comprises a first waveguide disposed on the first substrate to define a first optical path on the first substrate. The first waveguide is configured to guide a light signal along the first optical path. The first waveguide is also configured to transmit, at an output section of the first waveguide, the light signal out of the first waveguide toward the second substrate. The system also comprises a second waveguide disposed on the second substrate to define a second optical path on the second substrate. An input section of the second waveguide is aligned with the output section of the first waveguide to receive the light signal transmitted by the first waveguide toward the second substrate. The second waveguide is configured to guide the light signal received at the input section along the second optical path.

In another example, a light detection and ranging (LIDAR) device comprises a plurality of substrates disposed in an overlapping arrangement. The plurality of substrates includes at least a first substrate and a second substrate. The LIDAR device also comprises a light emitter configured to emit a light signal. The LIDAR device also comprises a first waveguide disposed on the first substrate to define a first optical path on the first substrate. The first waveguide is configured to guide the light signal along the first optical path. The first waveguide is also configured to transmit, at an output section of the first waveguide, the light signal out of the first waveguide toward the second substrate. The LIDAR device also comprises a second waveguide disposed on the second substrate to define a second optical path on the second substrate. An input section of the second waveguide overlaps the output section of the first waveguide. The second waveguide is configured to receive the light signal from the first waveguide at the input section and to guide the light signal along the second optical path.

In yet another example, a method involves receiving light at a first waveguide that defines a first optical path on a first substrate of a plurality of substrates disposed in an overlapping arrangement. The method also involves guiding, inside the first waveguide, the light along the first optical path toward an output section of the first waveguide. The method also involves transmitting, at the output section, the light out of the first waveguide toward a second substrate of the plurality of substrates. The method also involves receiving, at an input section of a second waveguide disposed on the second substrate, the light transmitted from the output section of the first waveguide. The input section of the second waveguide is aligned with the output section of the first waveguide. The method also involves guiding, inside the second waveguide, the light along a second optical path defined by the second waveguide on the second substrate.

In still another example, a system comprises means for receiving light at a first waveguide that defines a first optical path on a first substrate of a plurality of substrates disposed in an overlapping arrangement. The system also comprises means for guiding, inside the first waveguide, the light along the first optical path toward an output section of the first waveguide. The system also comprises means for transmitting, at the output section, the light out of the first waveguide toward a second substrate of the plurality of substrates. The system also comprises means for receiving, at an input section of a second waveguide disposed on the second substrate, the light transmitted from the output section of the first waveguide. The input section of the second waveguide is aligned with the output section of the first waveguide. The system also comprises means for guiding, inside the second waveguide, the light along a second optical path defined by the second waveguide on the second substrate.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 4A illustrates a first cross-section view of a system that includes a multi-layer waveguide assembly, according to example embodiments.

DETAILED DESCRIPTION

Any example embodiment or feature described herein is not necessarily to be construed as preferred or advantageous over other embodiments or features. The example embodiments described herein are not meant to be limiting. It will be readily understood that certain aspects of the disclosed implementations can be arranged and combined in a wide variety of different configurations. Furthermore, the particular arrangements shown in the figures should not be viewed as limiting. It should be understood that other implementations might include more or less of each element shown in a given figure. In addition, some of the illustrated elements may be combined or omitted. Similarly, an example implementation may include elements that are not illustrated in the figures.

I. OVERVIEW

Some example optical systems disclosed herein can be employed for routing multiple optical signals (e.g., multiple signal channels) along separate optical paths that at least partially overlap one another. One example system includes a plurality of substrates (e.g., glass substrates, etc.) in an overlapping arrangement. The system also includes a multi-layer assembly of waveguides configured to route a first light signal along a first optical path and a second light signal along a second optical path. Each layer of the multi-layer assembly corresponds to one or more waveguides disposed on a respective substrate of the plurality of substrates.

In some examples, a first waveguide disposed on a first substrate is optically coupled to a second waveguide disposed on a second substrate. For example, the first optical path may extend along the first substrate inside the first waveguide and then continue along the second substrate inside the second waveguide. With this arrangement, for instance, the two optical paths (or one or more sections of thereof) could extend in different directions (e.g., non-parallel, etc.) without physically intersecting one another. Whereas, in an alternative single-layer waveguide arrangement, for instance, the two optical paths would instead physically cross or intersect one another.

Other aspects, features, implementations, configurations, arrangements, and advantages are possible.

II. EXAMPLE SYSTEMS AND DEVICES

Figure 1A:
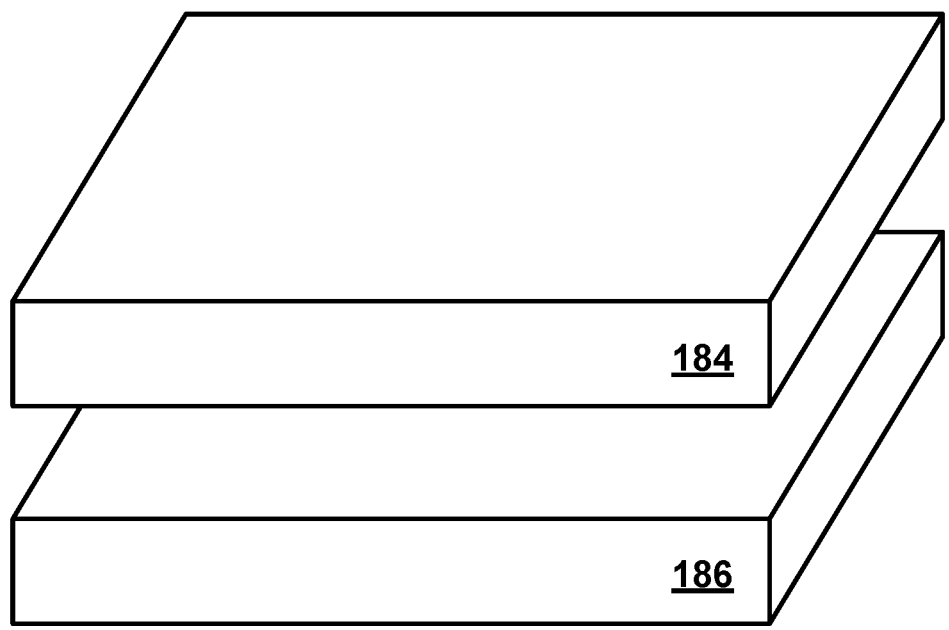
FIG. 1A illustrates a multi-layer optical system, according to example embodiments.

FIG. 1A illustrates a multi-layer optical system 100, according to example embodiments. As shown, system 100 includes a plurality of substrates 184, 186 in an overlapping arrangement. It is noted that system 100 is shown to include two overlapping substrates 184 and 186 for convenience in description. In alternate embodiments, system 100 could alternatively include fewer or more substrates. In a first embodiment, system 100 may alternatively include a single substrate. In this embodiment, a first layer of multi-layer optical system 100 may include one or more optical components (e.g., waveguides) disposed on a first side of the single substrate, and a second layer may include one or more other components disposed on a second side of the single substrate opposite the first side. In a second embodiment, system 100 may include three, four, or more substrates arranged similarly to the overlapping arrangement of substrates 184, 186 shown in FIG. 1A.

In the embodiment shown, overlapping sides (e.g., walls) of the respective substrates 184 and 186 are arranged substantially parallel to one another. In alternate embodiments however, a given substrate could instead be tilted at an offset angle relative to an adjacent substrate in the overlapping arrangement of substrates.

In some examples, the plurality of substrates of system 100 may be physically coupled to one another such that adjacent substrates are separated by at least a given separation distance. For example, system 100 may also include one or more spacing structures (not shown), such as ball bearings, optical fibers, or any other type of solid spacing structure, disposed between substrates 184 and 186 to physically separate the two substrates from one another by at least the given separation distance. The given separation distance may be any distance depending on various applications of system 100. In one embodiment, the given separation distance may be between 10 micrometers and 1 millimeter. Other separation distances are possible as well.

In alternative examples, two or more substrates of the plurality of substrates in system 100 may be physically in contact with one another (e.g., one substrate disposed on the other, etc.). For example, adjacent surfaces of substrates 184 and 186 in the overlapping arrangement may be alternatively physically coupled without a separation distance between the two substrates (e.g., glued together, etc.). In this example, the two substrates may effectively correspond to a single combined substrate that has double the thickness of each individual substrate. With this arrangement for instance, two layers of optical components (e.g., disposed on outer surfaces of the combined substrate) can be efficiently aligned (e.g., during calibration, assembly, etc.) by moving (e.g., sliding, etc.) an individual substrate relative to the other individual substrate (e.g., before physically coupling the two individual substrates in a fixed relative arrangement, etc.). Other examples and/or advantages are possible as well.

Substrates 184, 186 may include any substrate suitable for supporting one or more signal routing structures (not shown in FIG. 1A) and/or other types of optical devices disposed on the substrates. In one embodiment, overlapping and/or parallel sides of substrates 184, 186 may be configured as mounting surfaces on which optical waveguides (not shown in FIG. 1A) or other optical components are mounted. Thus, in this embodiment, optical components disposed on each respective mounting surface may correspond to a respective layer in a multi-layer assembly of optical components.

In some embodiments, substrates 184 and/or 186 are formed from or include a transparent or partially transparent material (e.g., glass slide, cover glass, plastic film, etc.), which is at least partially transparent to one or more wavelengths of light. For example, where system 100 is employed for routing optical signals in the infrared wavelength range, the material used in substrates 184, 186 may be at least partially transparent to infrared wavelengths of light. Other wavelengths are possible as well.

In alternate embodiments, substrates 184 and/or 186 could instead be formed from or include an opaque material (e.g., a semiconductor substrate such as silicon or gallium arsenide, a printed circuit board (PCB) substrate, or any other type of opaque substrate).

Figure 1B:
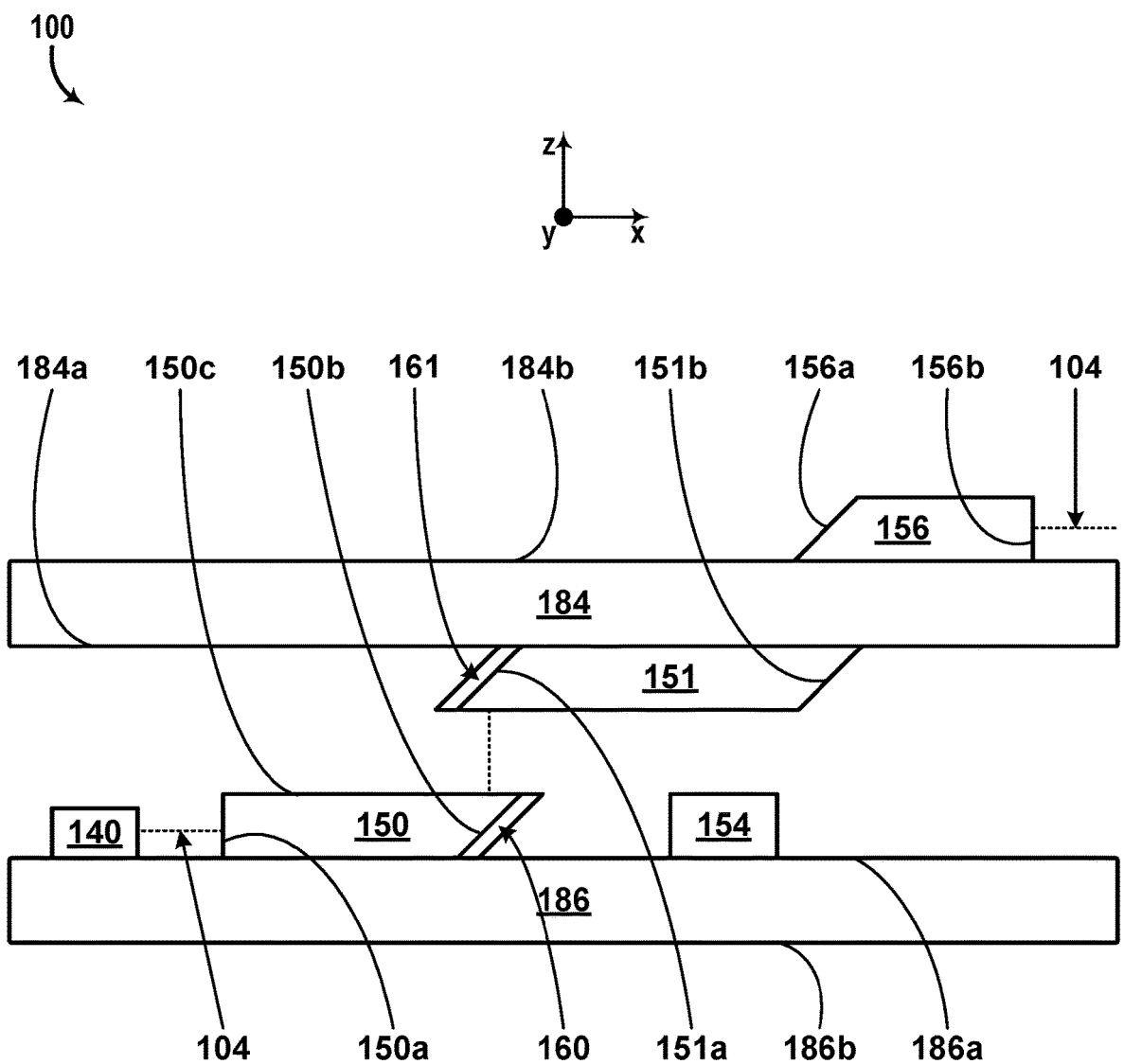
FIG. 1B illustrates a cross-section view of the system of FIG. 1A.

FIG. 1B illustrates a cross-section view of system 100. For purposes of illustration, FIG. 1B shows x-y-z axes, where the y-axis extends through the page. Additionally, it is noted that one or more components of system 100 are omitted from the illustrations of FIG. 1A and/or 1B for convenience in description.

As shown, system 100 also includes light emitter 140, waveguides 150, 151, 154, 156, and mirrors 160, 161. In alternative examples, system 100 may include fewer or more components than those shown.

Light emitter 140 may include a laser diode, fiber laser, a light-emitting diode, a laser bar, a nanostack diode bar, a filament, a LIDAR transmitter, or any other light source configured to emit light 104. In some embodiments, emitter 140 may be implemented as a pulsed laser (as opposed to a continuous wave laser), allowing for increased peak power while maintaining an equivalent continuous power output. Other implementations are possible.

Waveguides 150, 151, 154, 156 can be formed from a glass substrate (e.g., glass plate, etc.), a photoresist material (e.g., SU-8, etc.), or any other material at least partially transparent to one or more wavelengths of emitted light 104. As noted above, in some examples, overlapping (and/or parallel) sides of substrates 184, 186 may be configured as mounting surfaces of respective layers in a multi-layer assembly of optical components. As shown in FIG. 1B for example, one or more optical components (e.g., waveguide 156) can be disposed on a first surface (e.g., side 184b of substrate 184) as a first layer of optical components in the multi-layer optical system 100, one or more optical components (e.g., waveguide 151) can be disposed on a second surface (e.g., side 184a of substrate 184) as a second layer of optical components in the multilayer optical system 100, and one or more optical components (e.g., waveguides 150, 154, emitter 140, etc.) can be disposed on a third surface (e.g., side 186a of substrate 186) as a third layer of optical components in the multi-layer optical system 100. Although not shown, in some examples, system 100 may alternatively or additionally include one or more layers of optical components mounted on other surfaces of substrates 184 and 186 (e.g., side 186b), and/or on other substrates (not shown) (e.g., system 100 may include more than the two substrates 184, 186 in the overlapping arrangement, etc.).

In some embodiments, waveguides 150, 151, 154, 156 can be disposed onto the respective surfaces of substrates 184, 186 shown via optical lithography. For example, a photosensitive material (e.g., photoresist, etc.) can be disposed on substrates 184, 186, and then selectively etched to form waveguides 150, 151, 154, 156 having the respective shapes and positions shown in FIG. 1B. To that end, the photosensitive material may include SU-8 or any other photosensitive material. In some examples, the photosensitive material could be patterned to form other optical elements, such as input couplers, output couplers, and/or other optical elements, in addition to or instead of waveguides 150, 151, 154, 156. In some implementations, waveguides 150, 151, 154, 156 may be configured as multi-mode waveguides to facilitate total internal reflection of light signals guided therein. Other implementations are possible as well.

Mirrors 160, 161 may be formed from any reflective material that has reflectivity characteristics suitable for reflecting (at least partially) wavelengths of light 104. To that end, a non-exhaustive list of example reflective materials includes gold, aluminum, other metal or metal oxide, synthetic polymers, hybrid pigments (e.g., fibrous clays and dyes), among other examples.

In the example arrangement shown in FIG. 1B, emitter 140 is aligned to emit a first light signal 104 into an "input section" of waveguide 150. The input section of waveguide 150 corresponds to a section of waveguide 150 (e.g., side 150a) through which light signal 104 enters the waveguide. Further, in this example, waveguide 150 is disposed on substrate 186 and shaped to define a first optical path inside waveguide 150 for guiding light signal 104 (in the x-direction) toward side 150b of waveguide 150. As shown, side 150b is tilted toward substrate 184, and mirror 160 is disposed on the tilted edge of side 150b. In this example, mirror 160 may be configured as an "output mirror" of waveguide 150 that reflects light signal 104 out of waveguide 150 and toward substrate 184 (as illustrated by the dotted lines). The section of waveguide 150 through which light signal 104 exits the waveguide may be referred to herein as an "output section" of waveguide 150.

As shown, an angle between the tilted edge of side 150b and side 150c is an acute angle. In one embodiment, the acute tilting angle of tilted edge 150b may be 45 degrees. However, other tilting angles are possible depending on the arrangement of the various components of system 100 (e.g., waveguides, 150, 151, etc.).

Waveguide 151 then receives light signal 104 at an "input section" of waveguide 151 aligned with the output section of waveguide 150. In the example shown, the input section of waveguide 151 corresponds to a section of waveguide 151 that overlaps the output section (from which light signal 104 exits waveguide 150). In alternate examples however, the input section of waveguide 151 does not necessarily overlap waveguide 150. For instance, waveguide 150 may be configured to transmit light signal 104 in a different direction instead of the z-direction illustrated in FIG. 1B. In this instance, the input section of waveguide 151 may be aligned to intercept light signal 104 from waveguide 150 at a different location (e.g., depending on the location of the output section and the angle at which light signal 104 exits waveguide 150).

In the example shown, waveguide 151 is disposed on substrate 184 and shaped to define a second optical path (in the x-direction) on substrate 184. Further, as shown, waveguide 151 includes a tilted edge 151a (on which mirror 161 is disposed) at or near the input section of waveguide 151. Thus, mirror 161 may be configured as an input mirror of waveguide 151, which reflects light signal 104 (or portions thereof) incident on mirror 161 back into waveguide 151 and toward an output section of waveguide 151 (e.g., side 151b). In the example shown, the second optical path defined by waveguide 151 extends in the x-direction toward an output section of waveguide 151 (e.g., side 151b).

As shown, side 151b waveguide 151 is tilted toward substrate 184. In this example, light signal 104 (guided inside waveguide 151) may be internally reflected at edge 150b (e.g., via total internal reflection (TIR)) toward substrate 184, and then transmitted out of waveguide 151 at the output location defined by side 151b through substrate 184 and toward waveguide 156. To facilitate this, for example, the tilting angle of side 151b can be selected such that light signal 104 is incident on side 151b from one or more angles-of-incidence (e.g., less than the critical angle required for TIR, etc.) suitable for internally reflecting light signal 104 at side 151b.

Similarly, although system 100 is shown to include mirrors 160 and 161, in alternative examples, system 100 could instead be implemented without mirror 160 and/or mirror 161 (e.g., light signal 104 could be internally reflected at edges 150b and/or 151a instead of being reflected, respectively, by mirrors 160 and/or 161).

As shown, waveguide 154 is disposed in a same layer of system 100 as waveguide 150 (i.e., on side 186a of substrate 186). Waveguide 154 may extend through the page (i.e., in the y-direction) to define a third optical path inside waveguide 154. For example, waveguide 154 may be configured to guide a second light signal different than light signal 104 along the third optical path. In this example, waveguide 154 extends in a direction (e.g., y-direction) that is non-parallel to the guiding direction (e.g., x-direction) of waveguides 150, 151, 156). Further, as shown, a first section of waveguide 154 overlaps a second section of waveguide 151. For example, the first section may be less than a threshold distance to the second section.

In the example shown, waveguide 156 may be included in the third layer of multi-layer system 100 (on side 184b of substrate 184), and may be configured to receive light signal 104 (transmitted out of waveguide 151) at an input end 156a of waveguide 156. In this example, waveguide 156 extends to define a fourth optical path (e.g., in the x-direction) for light signal 104 between an input end 156a (on surface 184b of substrate 184). Further, in the example shown, input side 156a may be tilted toward waveguide 151 (e.g., at a suitable tilting angle for internally reflecting light signal 104 incident thereon toward output side 156b, etc.).

Thus, in this example arrangement, the multi-layer optical system 100 defines a combined optical path for light signal 104 extending in the x-direction from emitter 140 to side 151b of waveguide 151. A first part of this combined optical path is in a first layer of multi-layer system 100 (i.e., on surface 186a of substrate 186); a second part of the combined optical path is in a second layer (i.e., on surface 184a of substrate 184); and a third part of the combined optical path is in a third layer (i.e., on surface 184b of substrate 184). Additionally, system 100 defines a separate non-parallel optical path within waveguide 154, which does not intersect the combined optical path of light signal 104 (e.g., the two paths cross below or above one another in different layers of system 100).

Figure 1C:
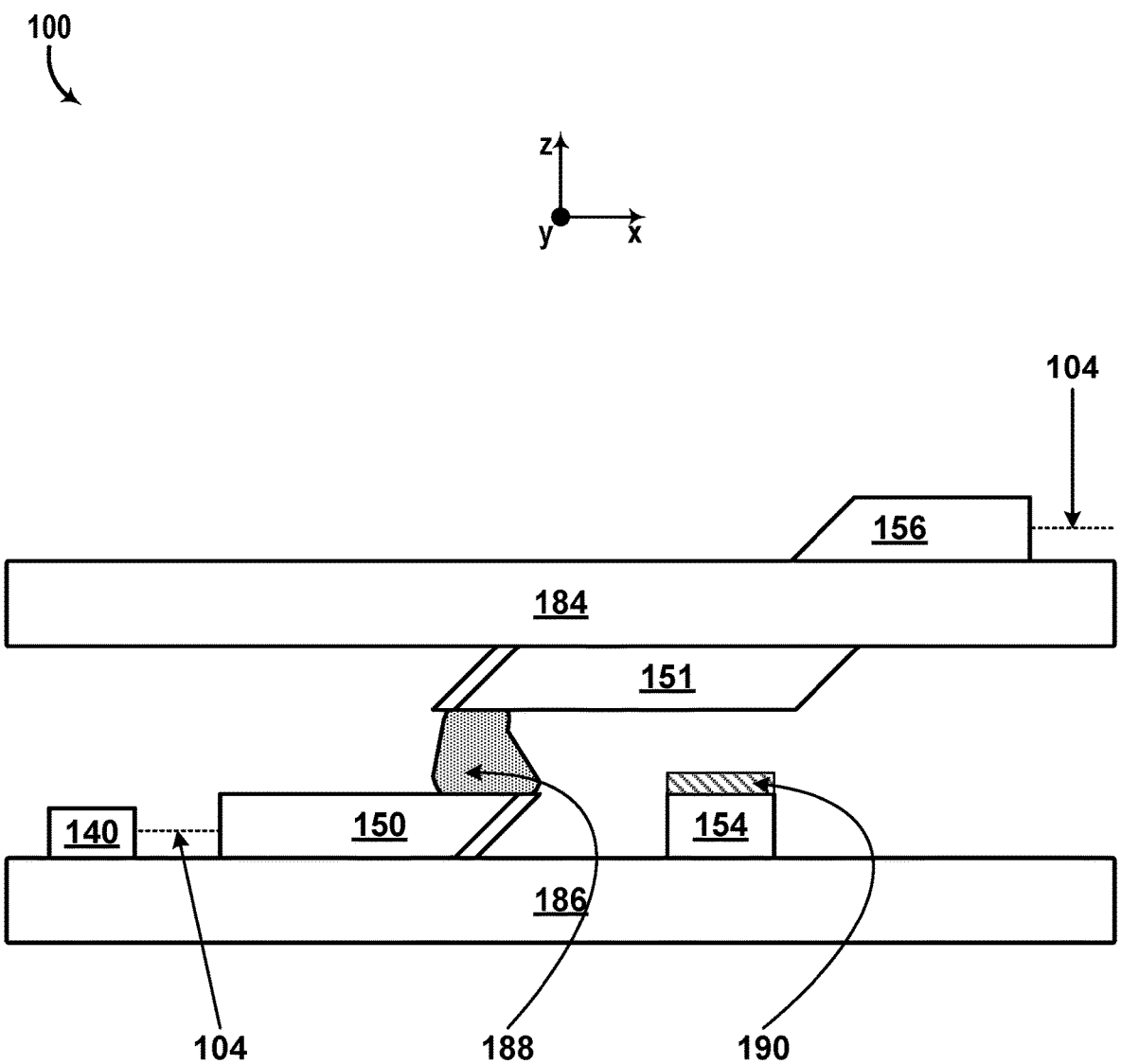
FIG. 1C illustrates another cross-section view of the system of FIG. 1A.

FIG. 1C illustrates another cross-section view of system 100. As shown, system 100 also includes an optical material 188 positioned between the output section of waveguide 150 and the input section of waveguide 151, and an optical shield 190 positioned between waveguide 154 and waveguide 151.

Optical material 188 may be formed from any material (e.g., photoresist, SU-8, glass, plastic, etc.) that is at least partially transparent to the wavelengths of light 104, and that has a refractive index that is within a threshold to refractive index(es) of waveguides 150, 151. With this arrangement for instance, optical material 188 may facilitate the transfer of light signal 104 from waveguide 150 to waveguide 151. In some examples, optical material 188 may comprise an optical adhesive configured to physically couple the input section to the output section.

Optical shield 190 may be configured to reduce a likelihood of interference between the respective light signals guided in waveguides 151 and 154 from interfering with one another (e.g., portions which may be transmitted out of the waveguides near their overlapping sections instead of at their respective output sections, etc.). To that end, for example, optical shield 190 (or a portion thereof) may be located between waveguide 151 and 154 (e.g., at or near overlapping sections of the waveguides, etc.). In some examples, optical shield 190 may comprise one or more light absorbing materials (e.g., black carbon, black chrome, black plastic, etc.). In other examples, optical shield 190 may additionally or alternatively comprise one or more reflective materials (e.g., metals, metal oxides, etc.). Other examples are possible.

In some embodiments, optical shield 190 may comprise a coating layer (e.g., gold, copper, other metallic coating later, etc.) disposed on a first section of waveguide 154 that overlaps waveguide 151, a second section of waveguide 151 that overlaps waveguide 154, or both the first section and the second section.

As noted above, optical system 100 can be employed for routing optical signals in a variety of systems and technology fields, such as light detection and ranging (LIDAR) devices, medical imaging devices, data communication systems, among other examples.

Figure 2A:
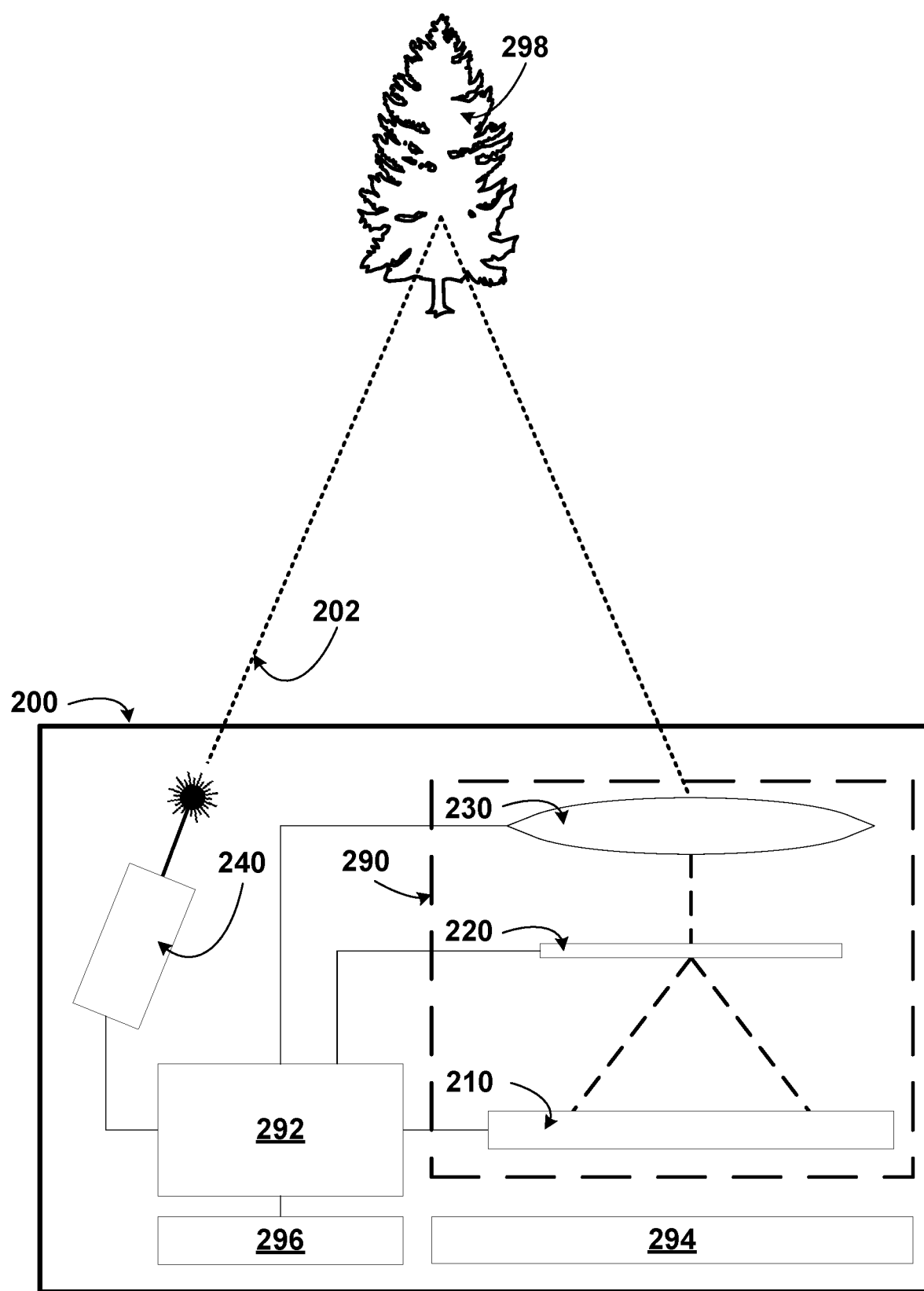
FIG. 2A is a simplified block diagram of a LIDAR device, according to example embodiments.

FIG. 2A is a simplified block diagram of a LIDAR device 200, according to example embodiments. In some examples, LIDAR device 200 can be mounted to a vehicle and employed to map a surrounding environment (e.g., a scene including object 298, etc.) of the vehicle. As shown, LIDAR 200 includes a laser emitter 240 that may be similar to emitter 140, an optical system 290, a controller 292, a rotating platform 294, and one or more actuators 296.

System 290 includes one or more light detectors 210, an opaque material 220, and a lens 230. It is noted that LIDAR device 200 may alternatively include more or fewer components than those shown, such as any of the components described for system 100 (e.g., waveguides, etc.).

Detector(s) 210 may include one or more light detectors. In one embodiment, detector(s) 210 include an array of light detectors that define a detection region for detecting the light 202 focused by lens 230. Additionally, light detector(s) 210 may include various types of light detectors, such as photodiodes, single photon avalanche diodes (SPADs), other types of avalanche photodiodes (APDs), silicon photomultipliers (SiPMs), multi-pixel photon counters (MPPCs), photoresistors, charge-coupled devices (CCDs), photovoltaic cells, and/or any other type of light detector.

Opaque material 220 (e.g., mask, aperture stop, etc.) may block a portion of light 202 returning from the scene (e.g., background light) and focused by the lens 230 from being transmitted to detector(s) 210. For example, opaque material 220 may be configured to block certain background light that could adversely affect the accuracy of a measurement performed by detector(s) 210. Alternatively or additionally, opaque material 220 may block light in the wavelength range detectable by detector(s) 210, etc. In one example, opaque material 220 may block transmission by absorbing a portion of incident light. In another example, opaque material 220 may block transmission by reflecting a portion of incident light. A non-exhaustive list of example implementations of opaque material 220 includes an etched metal, a polymer substrate, a biaxially-oriented polyethylene terephthalate (BoPET) sheet, or a glass overlaid with an opaque mask, among other possibilities. In some examples, opaque material 220 may include one or more apertures through which focused light 202 (or a portion thereof) may be transmitted through opaque material 220.

Lens 230 may focus light 202 returning from the scene toward the aperture of opaque material 220. With this arrangement, the light intensity collected from the scene, at lens 230, may be focused to have a reduced cross-sectional area over which light 202 is projected (i.e., increased spatial power density of light 202). To that end, lens 230 may include a converging lens, a biconvex lens, and/or a spherical lens, among other examples. Alternatively, lens 230 can be implemented as a consecutive set of lenses positioned one after another (e.g., a biconvex lens that focuses light in a first direction and an additional biconvex lens that focuses light in a second direction). Other types of lenses and/or lens arrangements are also possible. In addition, system 290 may include other optical elements (e.g., mirrors, etc.) positioned near lens 230 to aid in focusing light 202 incident on lens 230 onto opaque material 220.

Device 200 may operate emitter 240 to emit light 202 toward a scene that includes object 298. To that end, in some implementations, emitter 240 (and/or one or more other components of device 200) can be configured as a LIDAR transmitter of LIDAR device 200. Device 200 may then detect reflections of light 202 returning from the scene to determine information about object 298. To that end, in some implementations, detector(s) 210 (and/or one or more other components of system 290) can be configured as a LIDAR receiver of LIDAR device 200.

Controller 292 may be configured to control one or more components of LIDAR device 200 and to analyze signals received from the one or more components. To that end, controller 292 may include one or more processors (e.g., a microprocessor, etc.) that execute instructions stored in a memory (not shown) of device 200 to operate device 200. Additionally or alternatively, controller 292 may include digital or analog circuitry wired to perform one or more of the various functions described herein.

Rotating platform 294 may be configured to rotate about an axis to adjust a pointing direction of LIDAR 200 (e.g., direction of emitted light 202 relative to the environment, etc.). To that end, rotating platform 294 can be formed from any solid material suitable for supporting one or more components of LIDAR 200. For example, system 290 (and/or emitter 240) may be supported (directly or indirectly) by rotating platform 294 such that each of these components moves relative to the environment while remaining in a particular relative arrangement in response to rotation of rotating platform 294. In particular, the mounted components could be rotated (simultaneously) about an axis so that LIDAR 200 may adjust its pointing direction while scanning the surrounding environment. In this manner, a pointing direction of LIDAR 200 can be adjusted horizontally by actuating rotating platform 294 to different directions about the axis of rotation. In one example, LIDAR 200 can be mounted on a vehicle, and rotating platform 294 can be rotated to scan regions of the surrounding environment at various directions from the vehicle.

In order to rotate platform 294 in this manner, one or more actuators 296 may actuate rotating platform 294. To that end, actuators 296 may include motors, pneumatic actuators, hydraulic pistons, and/or piezoelectric actuators, among other possibilities.

With this arrangement, controller 292 could operate actuator(s) 296 to rotate rotating platform 294 in various ways so as to obtain information about the environment. In one example, rotating platform 294 could be rotated in either direction about an axis. In another example, rotating platform 294 may carry out complete revolutions about the axis such that LIDAR 200 scans a 360° field-of-view (FOV) of the environment. In yet another example, rotating platform 294 can be rotated within a particular range (e.g., by repeatedly rotating from a first angular position about the axis to a second angular position and back to the first angular position, etc.) to scan a narrower FOV of the environment. Other examples are possible.

Moreover, rotating platform 294 could be rotated at various frequencies so as to cause LIDAR 200 to scan the environment at various refresh rates. In one embodiment, LIDAR 200 may be configured to have a refresh rate between 3 Hz and 30 Hz. For example, where LIDAR 200 is configured to scan a 360° FOV at a refresh rate of 10 Hz, actuator(s) 296 may rotate platform 294 for ten complete rotations per second. Other refresh rates are possible.

Figure 2B:
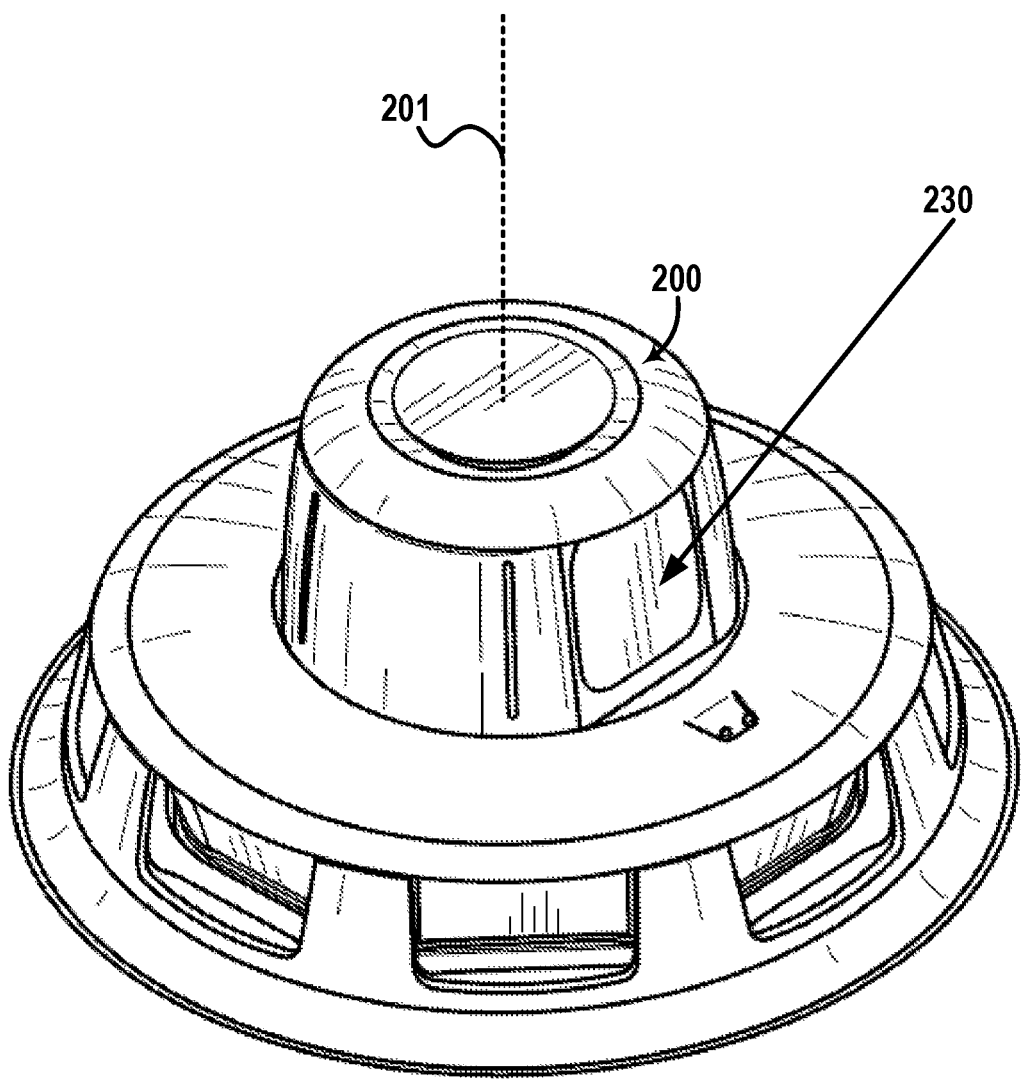
FIG. 2B illustrates a perspective view of the LIDAR device of FIG. 2A.

FIG. 2B illustrates a perspective view of LIDAR device 200. In some embodiments, device 200 may be configured to include a single shared lens 230 for both directing emitted light from emitter 240 toward the environment and focusing incident light 202 into system 290. In other embodiments, device 200 may include a separate transmitter lens (not shown) for directing the emitted light 240 different than the lens 230.

As shown in FIG. 2B, LIDAR 200 may be configured to rotate about an axis of rotation 201. In this way, LIDAR 200 can scan different regions of the surrounding environment according to different rotational positions of LIDAR 200 about axis 201. For instance, device 200 (and/or another computing system) can determine a three-dimensional map of a 360° (or less) view of the environment of device 200 by processing data associated with different pointing directions of LIDAR 200 as the LIDAR rotates about axis 201.

In some examples, axis 201 may be substantially vertical. In these examples, the pointing direction of device 200 can be adjusted horizontally by rotating system 290 (and emitter 240) about axis 201.

In some examples, device 200 can be tilted (relative to axis 201) to adjust the vertical extents of the FOV of LIDAR 200. By way of example, LIDAR device 200 can be mounted on top of a vehicle. In this example, system 290 (and emitter 240) can be tilted (e.g., toward the vehicle) to collect more data points from regions of the environment that are closer to a driving surface on which the vehicle is located than data points from regions of the environment that are above the vehicle. Other mounting positions, tilting configurations, and/or applications of LIDAR device 200 are possible as well (e.g., on a different side of the vehicle, on a robotic device, or on any other mounting surface).

Returning now to FIG. 2A, in some implementations, controller 292 may use timing information associated with a signal measured by detector(s) 210 to determine a location (e.g., distance from LIDAR device 200) of object 298. For example, in embodiments where emitter 240 is a pulsed laser, controller 292 can monitor timings of output light pulses and compare those timings with timings of signal pulses measured by array 210. For instance, controller 292 can estimate a distance between device 200 and object 298 based on the speed of light and the time of travel of the light pulse (which can be calculated by comparing the timings). In one implementation, during the rotation of platform 294, emitter 240 may emit light pulses (e.g., light 202), and system 290 may detect reflections of the emitted light pulses. Device 200 (or another computer system that processes data from device 200) can then generate a three-dimensional (3D) representation of the scanned environment based on a comparison of one or more characteristics (e.g., timing, pulse length, light intensity, etc.) of the emitted light pulses and the detected reflections thereof.

It is noted that the various functional blocks shown for the components of device 200 can be redistributed, rearranged, combined, and/or separated in various ways different than the arrangement shown.

Figure 3A:
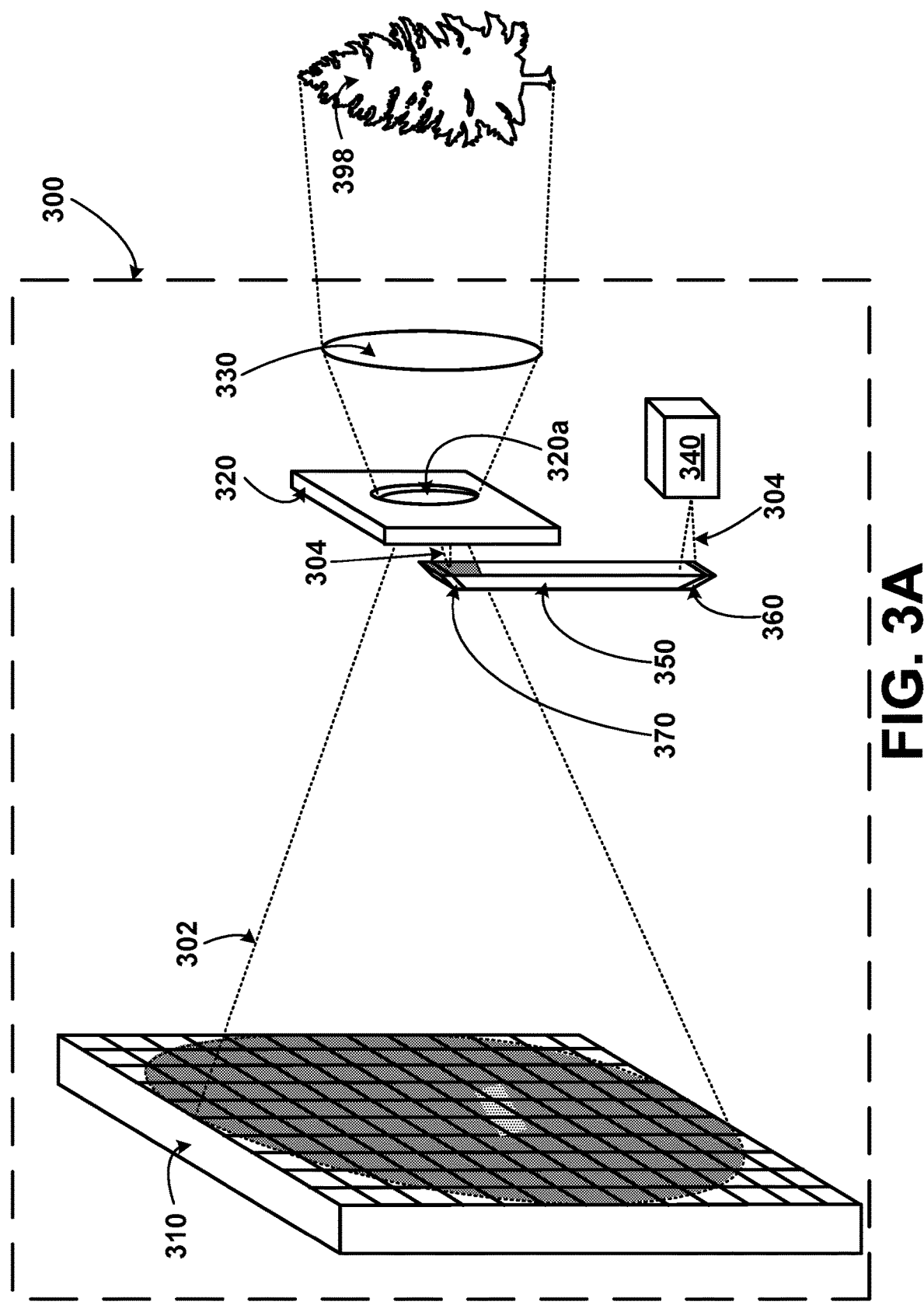
FIG. 3A is an illustration of a system that includes a waveguide, according to example embodiments.
Figure 3B:
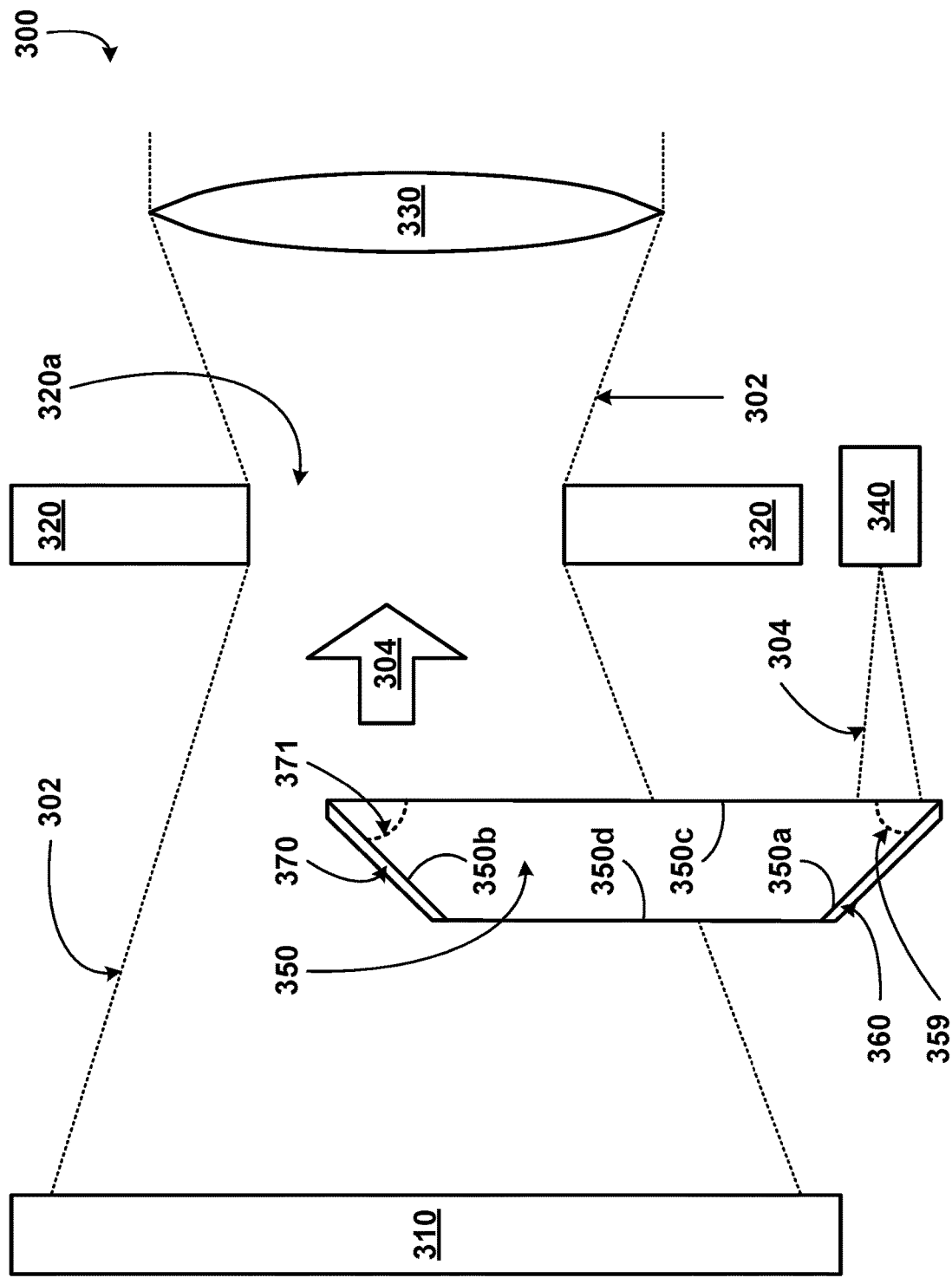
FIG. 3B illustrates a cross-section view of the system of FIG. 3A.

FIG. 3A is an illustration of a system 300 that includes a waveguide 350, according to example embodiments. FIG. 3B illustrates a cross-section view of the system 300. In some implementations, system 300 can be included in device 200 instead of or in addition to transmitter 240 and system 290. As shown, system 300 may measure light 302 reflected by an object 398 within a scene similarly to, respectively, device 200, light 202, and object 298. Further, as shown, system 300 includes a light detector array of light detectors 310, an opaque material 320, a lens 330, and a light source 340, which may be similar, respectively, to detector(s) 210, material 220, lens 230, and emitter 240.

As shown, system 100 also includes an aperture 320a defined within opaque material 320. For the sake of example, aperture 320a is shown to have an elliptical shape. However, other aperture shapes are possible (e.g., circular, rectangular, or any other shape). Aperture 320a provides a port within opaque material 320 through which light may be transmitted. Aperture 320a may be defined within opaque material 320 in a variety of ways. In one example, opaque material 320 (e.g., metal, etc.) may be etched to define aperture 320a. In another example, opaque material 320 may be configured as a glass substrate overlaid with a mask, and the mask may include a gap that defines aperture 320a (e.g., via photolithography, etc.). In various embodiments, aperture 320a may be partially or wholly transparent, at least to wavelengths of light that are detectable by light detector array 310. For example, where opaque material 320 is a glass substrate overlaid with a mask, aperture 320a may be defined as a portion of the glass substrate not covered by the mask, such that aperture 320a is not completely hollow but rather made of glass. Thus, in some instances, aperture 320a may be partially, but not entirely, transparent to one or more wavelengths of light 302. Alternatively, in some instances, aperture 320a may be formed as a hollow region of opaque material 320. Other aperture implementations are possible.

As shown, system 300 also includes waveguide 350 (e.g., optical waveguide, etc.), which may be similar to any of waveguides 150, 151, and/or 154. As shown, system 300 also includes an input mirror 360 and an output mirror 370, which may be similar to any of mirrors 160 and/or 161.

In the example shown, waveguide 350 is positioned between opaque material 320 and array 310. However, in other examples, opaque material 320 can be instead positioned between waveguide 350 and array 310. As shown, waveguide 350 may be arranged such that a portion of waveguide 350 extends into a propagation path of focused light 302, and another portion of waveguide 350 extends outside the propagation path of focused light 302. As a result, a first portion of focused light 302 transmitted through aperture 320a may be projected onto waveguide 350 (as illustrated by the shaded region on the surface of waveguide 350).

As best shown in FIG. 3B, a second portion of focused light 302 may propagate from lens 330 to array 310 without propagating through waveguide 350.

In some instances, at least part of the first portion of focused light 302 (projected onto waveguide 350) may propagate through transparent regions of waveguide 350 (e.g., from side 350c to side 350d and then out of waveguide 350 toward array 310, without being intercepted by mirror 370. However, in some instances, the first portion of focused light 302 may be at least partially intercepted by mirror 370 and then reflected away from array 310 (e.g., guided inside waveguide 350, etc.).

To mitigate this, in some examples, mirror 370 can be configured to have a small size relative to aperture 320a and/or relative to a projection area of focused light 302 at the location of mirror 370. In these examples, a larger portion of focused light 302 may propagate adjacent to mirror 370 (and/or waveguide 350) to continue propagating toward array 310. Alternatively or additionally, in some examples, mirror 370 can be formed from a partially or selectively reflective material (e.g., half mirror, dichroic mirror, polarizing beam splitter, etc.) that transmits at least a portion of focused light 302 incident thereon through mirror 370 for propagation toward array 310. Thus, in these examples as well, a larger amount of focused light 302 may eventually reach array 310.

In some examples, input mirror 360 may be configured to direct emitted light 304 (intercepted by mirror 360 from emitter 340) into waveguide 350. Waveguide 350 then guides light 304 inside waveguide 350 toward output mirror 370. Output mirror 370 may then reflect guided light 304 out of waveguide 350 and toward aperture 320a.

As best shown in FIG. 3B for example, input mirror 360 may be tilted at an offset angle 359 toward side 350c of waveguide 350. For example, an angle between mirror 360 and side 350c may be less than an angle between mirror 360 and side 360d. In one implementation, offset or tilting angle 359 of mirror 360 is 45°. However, other angles are possible. In the embodiment shown, input mirror 360 is disposed on side 350a of waveguide 350. Thus, in this embodiment, emitted light 304 may propagate into waveguide 350 through side 350c and then out of side 350a toward mirror 360. Mirror 360 may then reflect light 304 back into waveguide 350 through side 350a at a suitable angle of entry so that waveguide 350 can then guide light 304 toward side 350b. For example, waveguide 350 can be formed such that angle 359 between sides 350a and 350c is less than the angle between side 350a and side 350d (i.e., side 350a tilted toward side 350c). Input mirror 360 can then be deposited onto side 350a (e.g., via chemical vapor deposition, sputtering, mechanical coupling, or another process). However, in other embodiments, mirror 360 can be alternatively disposed inside waveguide 350 (e.g., between sides 350a and 350b), or may be physically separated from waveguide 350.

As best shown in FIG. 3B, output mirror 370 may also be tilted toward side 350c of waveguide 350. For example, an angle 371 between mirror 370 and side 350c may be less than an angle between mirror 370 and side 360d. In one implementation, offset or tilting angle 371 of mirror 370 is 45°. However, other angles are possible. Thus, in some examples, input mirror 360 may be tilted in a first direction (e.g., clockwise in the view of FIG. 3B) toward side 350c, and output mirror 370 may be tilted in a second direction (e.g., opposite to the first direction) toward side 350c. Output mirror 370 can be physically implemented in various ways similarly to mirror 360 (e.g., disposed on tilted side 350b of waveguide 350, etc.).

In some examples, waveguide 350 may be formed from a material that has a different index of refraction than that of materials surrounding waveguide 350. Thus, waveguide 350 may guide at least a portion of light propagating inside the waveguide via internal reflection (e.g., total internal reflection, frustrated total internal reflection, etc.) at one or more edges, sides, walls, etc., of waveguide 350. For instance, as shown in FIG. 3B, waveguide 350 may guide emitted light 304 (received from emitter 340) toward side 350b via internal reflection at sides 350c, 350d, and/or other sides of waveguide 350.

As shown in FIG. 3B, aperture 320a could be located adjacent to an output section of waveguide 350 to transmit light 304 toward lens 330. Lens 330 may then direct light 304 toward a scene. Emitted light 304 may then reflect off one or more objects (e.g., object 398) in the scene, and return to lens 330 (e.g., as part of light 302 from the scene). Lens 330 may then focus light 302 (which includes reflections of the emitted light 304) through aperture 320a and toward array 310.

With this arrangement, system 300 may emit light 304 from a substantially same physical location (e.g., aperture 320a) from which system 300 receives focused light 302 (e.g., aperture 320a). Because the transmit path of emitted light 304 and the receive path of focused light 302 are co-aligned (e.g., both paths are from the point-of-view of aperture 320a), system 300 may be less susceptible to the effects of parallax. For instance, data from a LIDAR device that includes system 300 could be used to generate a representation of the scene (e.g., point cloud) that is less susceptible to errors related to parallax.

It is noted that the sizes, positions, orientations, and shapes of the components and features of system 300 shown are not necessarily to scale, but are illustrated as shown only for convenience in description. It is also noted that system 300 may include fewer or more components than those shown, and one or more of the components shown could be arranged differently, physically combined, and/or physically divided into separate components.

In a first embodiment, waveguide 350 can alternatively have a cylindrical shape or any other shape. Additionally, in some examples, waveguide 350 can be implemented as a rigid structure (e.g., slab waveguide) or as a flexible structure (e.g., optical fiber). In a second embodiment, waveguide 350 may have a curved shape or other type of shape instead of the vertical rectangular configuration shown in FIGS. 3A and 3B. In a third embodiment, waveguide 350 can be alternatively implemented without a tilted edge 350a. For example, side 350a can be at a same (e.g., perpendicular, etc.) angle relative to sides 350c and 350d. In a fourth embodiment, mirrors 360, 370 can be omitted from system 300, and waveguide 350 can instead be configured to perform the functions described above for mirrors 360, 370. For example, sides 350a and 350b of waveguide 350 can be implemented as TIR mirrors that reflect light 304 into or out of waveguide 350.

FIG. 4A illustrates a first cross-section view of a system 400 that includes multiple waveguides, according to example embodiments. For purposes of illustration, FIG. 4A shows x-y-z axes, where the z-axis extends through the page. System 400 may be similar to systems 100, 290, and/or 300, and can be used with LIDAR device 200 instead of or in addition to system 290 and transmitter 240.

As shown, system 400 includes transmitters 440 and 442, each of which may be similar to emitter 140; a plurality of waveguides 450, 452, 454, 456, each of which may be similar to waveguide 150; and a plurality of output mirrors 460, 462, 464, 466, each of which may be similar to mirror 160. In some examples, the optical components of system 400 shown in FIG. 4A may correspond to a first layer of optical components disposed on a first substrate (e.g., substrate 186) of a plurality of overlapping substrates. Referring back to FIG. 1B for example, the side of waveguide 450 extending along the surface of the page may be similar to side 150c of waveguide 150.

In the example shown, transmitter 440 emits a first light signal 404, and transmitter 442 emits a second light signal 406. Waveguide 450 receives and guides a first light portion 404a of light signal 404 toward mirror 460, which then reflects light portion 404a out of waveguide 450 at an output section of the waveguide (illustrated as a shaded region of the waveguide) in the z-direction (i.e., out of the page). Similarly, waveguide 452 guides a second light portion 404b of the first light signal 404 along a second optical path; waveguide 454 guides a third light portion 406a of the second light signal 406 along a third optical path; and waveguide 456 guides a fourth light portion 406b along a fourth optical path.

Figure 4B:
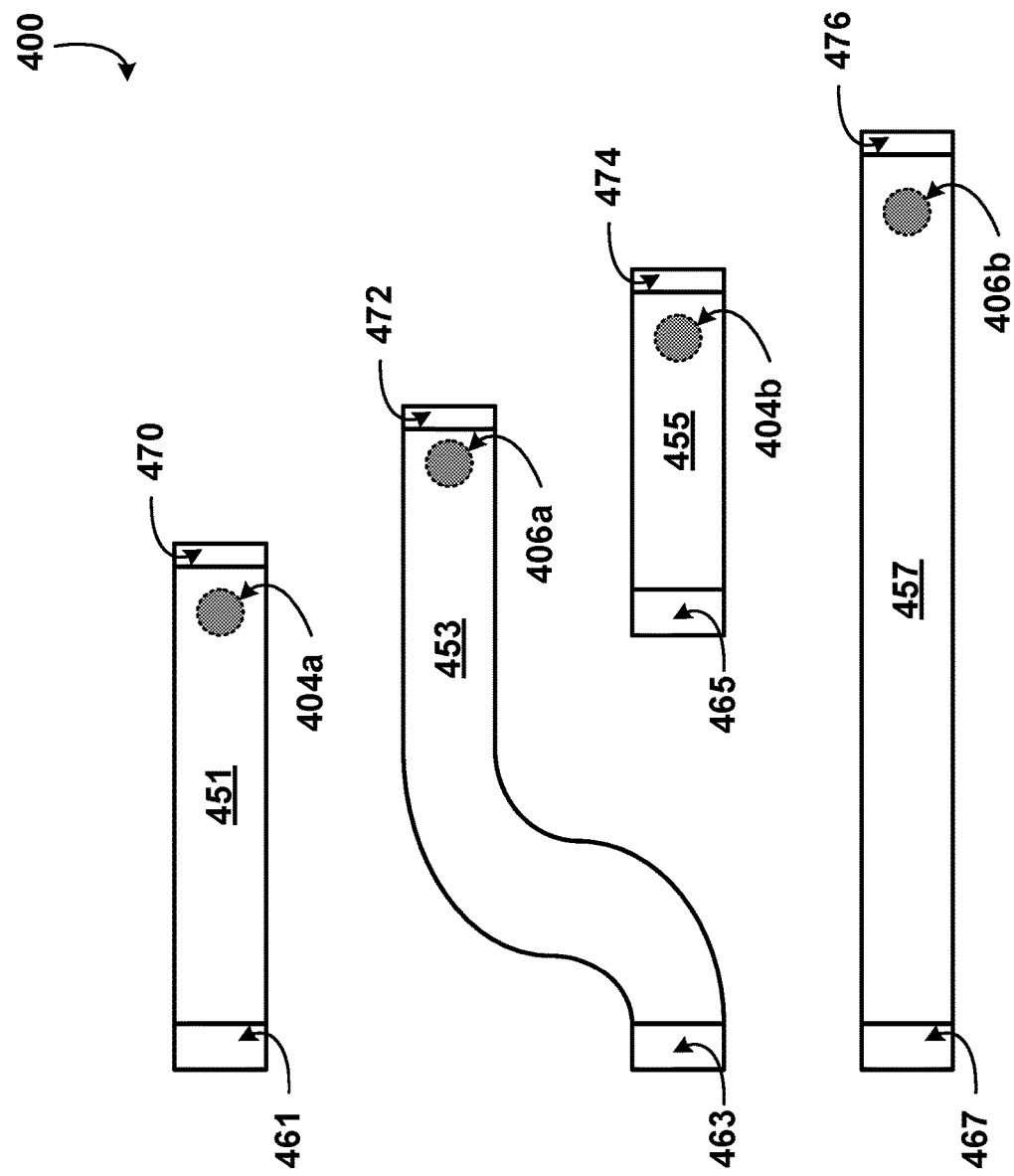
FIG. 4B illustrates a second cross-section view of the system of FIG. 4A.

FIG. 4B illustrates a second cross-section view of system 400, where the z-axis also extends through the page. As shown in FIG. 4B, system 400 also includes waveguides 451, 453, 455, 457, each of which may be similar to waveguide 151 of system 100; input mirrors 461, 463, 465, 467, each of which may be similar to mirror 161 of system 100; and output mirrors 470, 472, 474, 476, each of which may be similar to mirror 370 of system 300.

The optical components of system 400 shown in FIG. 4B may correspond to a second layer of optical components that overlaps the first layer of optical components shown in FIG. 4A. By way of example, referring back to FIG. 1B, the optical components of system 400 shown in FIG. 4A could be disposed on surface 186a of substrate 186; and the optical components of system 400 shown in FIG. 4B could be disposed on surface 184a of substrate 184. In this example, the side of waveguide 451 along the surface of the page in FIG. 4B may be similar to a side of waveguide 151 that is disposed on substrate 184 in FIG. 1B.

For instance, similarly to mirror 161 of system 100, input mirror 461 of system 400 may receive light portion 404a (transmitted out of waveguide 450 as shown in FIG. 4A). Mirror 461 may then reflect the light portion 404a incident thereon back into waveguide 451, and the waveguide may then guide light portion 404a toward mirror 470. Similarly to output mirror 370 of waveguide 350, output mirror 470 may then reflect light portion 404a out of waveguide 451 at an output section (shaded region) of the waveguide in the z-direction (out of the page).

Similarly, as shown in FIG. 4B, input mirror 463, waveguide 453, and output mirror 472 define an optical path for light portion 406a; input mirror 465, waveguide 455, and output mirror 474 define an optical path for light portion 404b; input mirror 467, waveguide 457, and output mirror 476 define an optical path for light portion 406b.

Figure 4C:
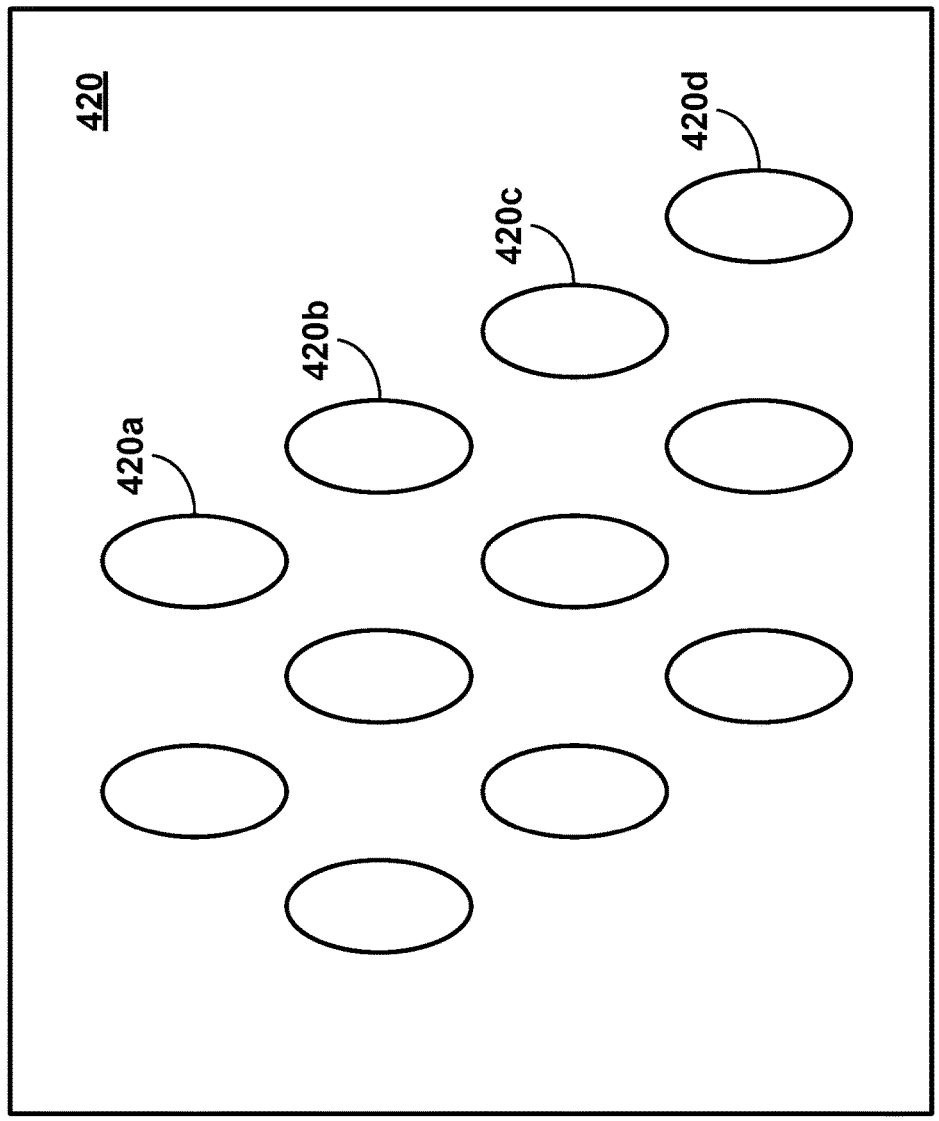
FIG. 4C illustrates a third cross-section view of the system of FIG. 4A.

FIG. 4C illustrates a third cross-section view of system 400, according to example embodiments. As shown in FIG. 4C, system 400 also includes an opaque material 420, which may be similar to opaque material 320 of system 300. As shown in FIG. 4C, opaque material 420 defines a plurality of apertures, exemplified by apertures 420a, 420b, 420c, and 420d, each of which may be similar to aperture 320a. For example, aperture 420a may be aligned with output mirror 470 similarly to, respectively, aperture 320a and output mirror 370. For instance, aperture 420a may overlap output mirror 470 in the direction of the z-axis to receive light 404a reflected by output mirror 470 out of waveguide 450. Similarly, aperture 420b can be aligned with output mirror 472 to receive light portion 406a, aperture 420c could be aligned with output mirror 474 to receive light portion 404b, and aperture 420d could be aligned with output mirror 476 to receive light portion 404 b. Thus, each aperture may be associated with a position of a respective transmit channel of system 400.

Additionally, in some examples, light from a scene (e.g., propagating into the page in FIG. 4B) could be focused onto opaque material 420, similarly to light 302 that is focused onto opaque material 320. In these examples, system 400 may thus provide multiple receive channels associated with respective portions of the focused light projected on opaque material 420 at the respective positions of apertures 420a, 420b, 420c, 420d, etc. For example, a first portion of the focused light transmitted through aperture 420a could be intercepted by a first light detector associated with a first receive channel, a second portion of the focused light transmitted through aperture 420b could be intercepted by a second light detector associated with a second receive channel, a third portion of the focused light transmitted through aperture 420c could be intercepted by a third light detector associated with a third receive channel, and a fourth portion of the focused light transmitted through aperture 420d could be intercepted by a fourth light detector associated with a fourth receive channel.

With this arrangement, each transmit channel may be associated with a transmit path that is spatially co-aligned (through a respective aperture) with a receive path associated with a corresponding receive channel.

Figure 4D:
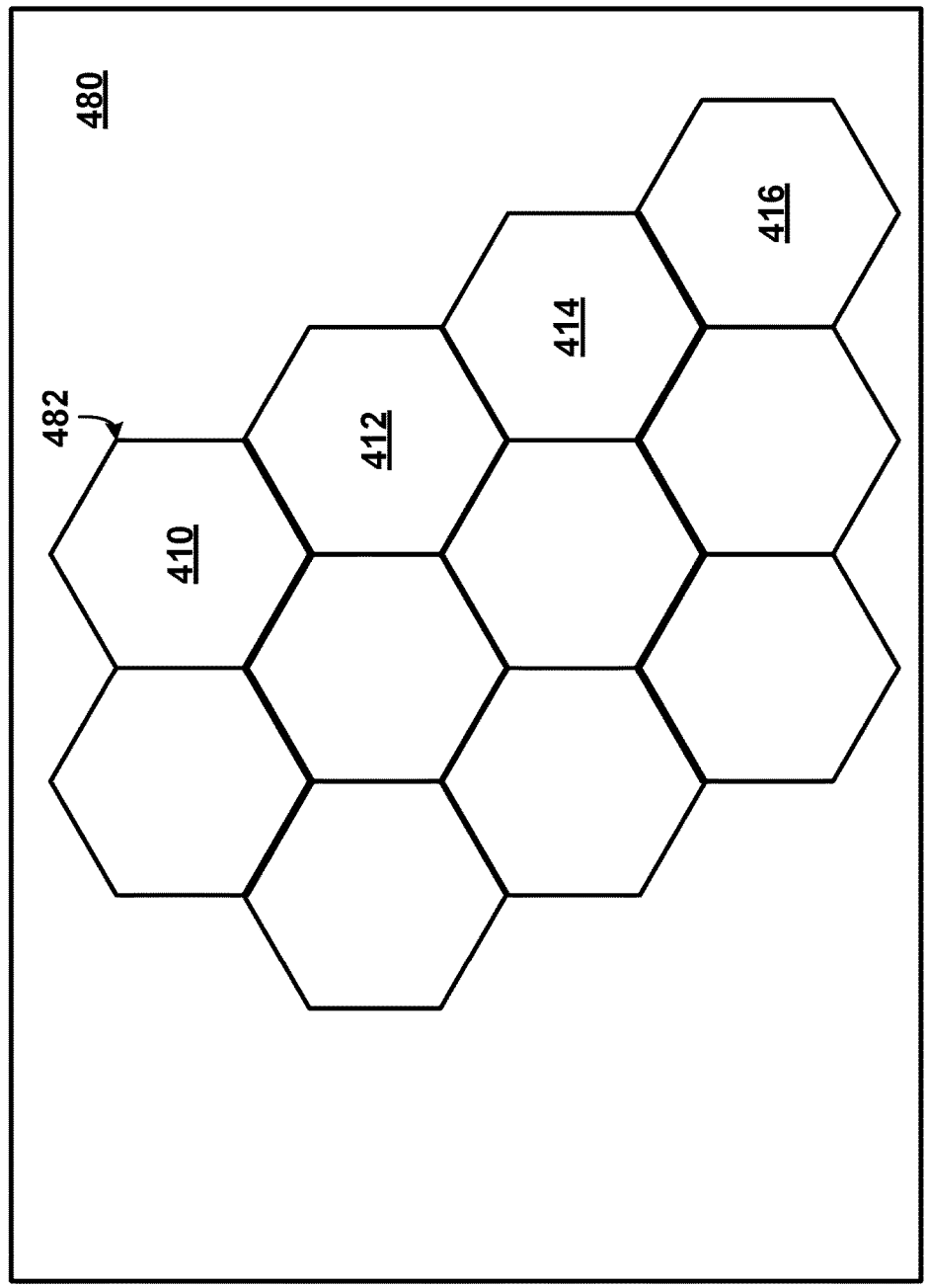
FIG. 4D illustrates a fourth cross-section view of the system of FIG. 4A.

FIG. 4D illustrates a fourth cross section view of system 400, in which the z-axis is also pointing out of the page. As shown in FIG. 4D, system 400 also includes a support structure 480 that mounts a plurality of receivers, exemplified by receivers 410, 412, 414, and 416, each of which may be similar to any of light detectors 210 and/or 310. Further, as shown, system 400 also includes one or more light shields 482.

Each of receivers 410, 412, 414, 416, 418, etc., may include one or more light detectors. Additionally, each receiver may be arranged to intercept focused light transmitted through a respective aperture of opaque material 420 (shown in FIG. 4C). For example, receivers 410, 412, 414, 416 may be arranged to intercept focused light that is transmitted, respectively, through apertures 420a, 420b, 420c, 420d (shown in FIG. 4C). In one embodiment, receivers 410, 412, 414, 416 may be positioned to overlap (e.g., in the direction of the z-axis), respectively, output mirrors 470, 472, 474, 476.

Support Structure 480 may include a solid structure that has material characteristics suitable for supporting receivers 410, 412, 414, 416, etc. In one example, support structure 480 may include a printed circuit board (PCB) to which the light detectors of receivers 410, 412, 414, 416, 418, etc., are mounted.

Light shield(s) 482 may comprise one or more light absorbing materials (e.g., black carbon, black chrome, black plastic, etc.) arranged around receivers 410, 412, 414, 416, etc. In some examples, light shield(s) 482 may prevent (or reduce) light from external sources (e.g., ambient light, etc.) from reaching receivers 410, 412, 414, 416, etc. Alternatively or additionally, in some examples, light shield(s) 482 may prevent or reduce cross-talk between receive channels associated with receivers 410, 412, 414, 416, etc. Thus, light shield(s) 482 may also be configured to optically separate receivers 410, 412, 414, 416, etc., from one another.

Returning now to FIG. 4C, as noted above, opaque material 420 defines a grid of apertures 410, 412, 414, 416, etc. Thus, in some examples where system 400 is included in a LIDAR device, each aperture in opaque material 420 may transmit light toward a respective portion of a field-of-view (FOV) of the LIDAR and also receive reflected portions of the transmitted light returning from that same respective portion of the FOV. Thus, each aperture may be associated with a transmit/receive channel of the LIDAR. In one embodiment, opaque material 420 may comprise four rows of 64 apertures, where each row of horizontally (e.g., along y-axis) adjacent apertures is separated by a vertical offset (e.g., along z-axis) from another row of apertures. In this embodiment, system 400 could thus provide 4*64=256 co-aligned transmit/receive channels. In other embodiments, system 400 may include a different number of transmit/receive channels (and thus a different number of associated apertures).

Additionally, the LIDAR in this example may have a plurality of light emitters, each of which is assigned to one or more transmit/receive channels. Referring back to FIG. 4A for instance, light emitter 440 transmits light portions 404a and 404b for scanning the transmit/receive channels associated with apertures 420a and 420c (shown in FIG. 4C); and light emitter 442 transmits light portions 406a and 406b for scanning the channels associated with apertures 420b and 420d.

Thus, in some examples, a multi-layer optical system arrangement such as the arrangements described for systems 100 and 400 can be employed in a LIDAR device (or other device that operates based on optical signals) to route light signals from multiple light emitter to multiple spatially separate transmit/channels via non-parallel optical paths (e.g., the optical paths of light portions 406a and 404b) and in a space-efficient manner.

It is noted that the sizes, shapes, and positions shown in FIGS. 4A-4D for the various components of system 400 are not necessarily to scale but are illustrated as shown only for convenience in description.

III. EXAMPLE METHODS

Figure 5:
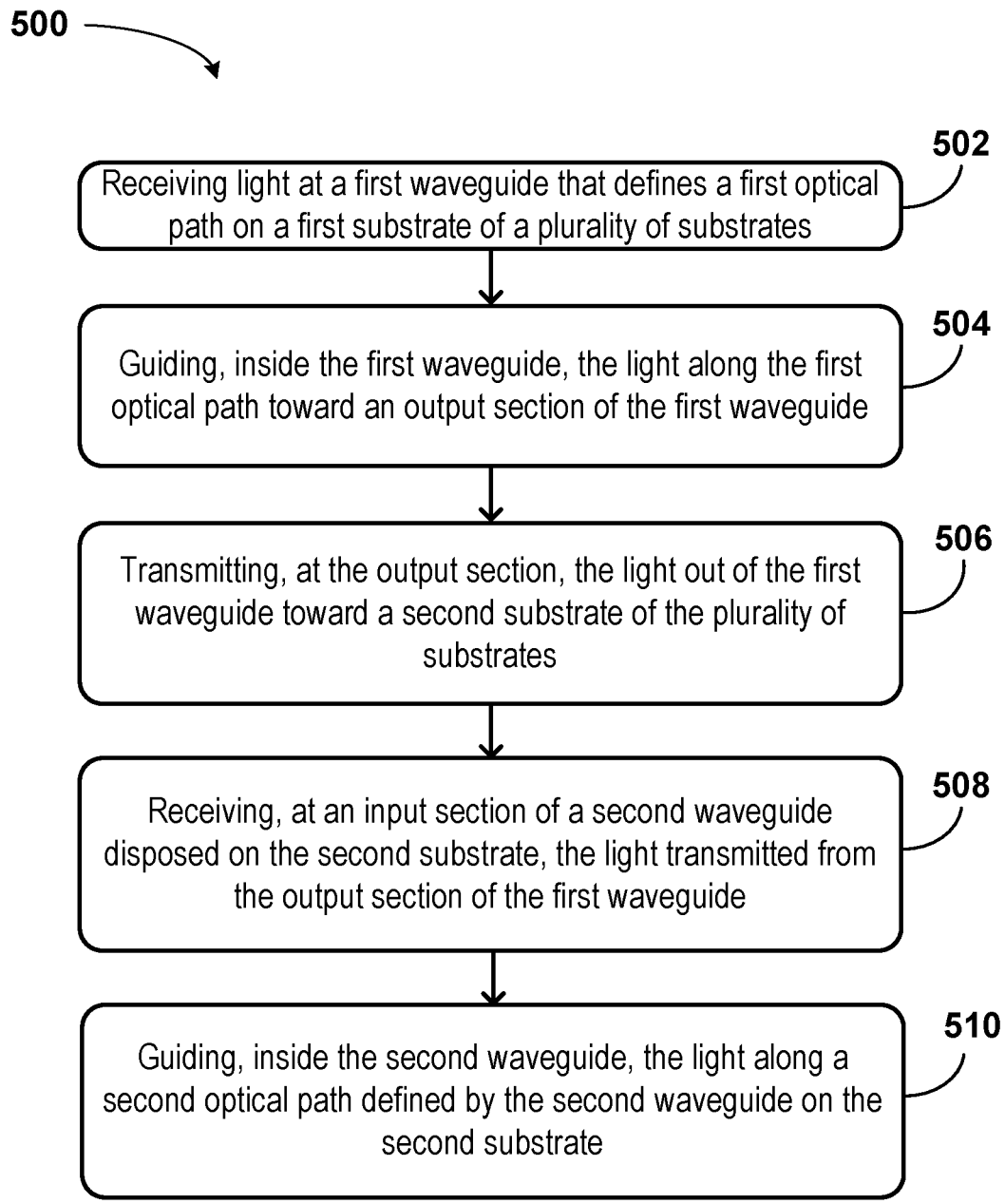
FIG. 5 is a flowchart of a method, according to example embodiments.

FIG. 5 is a flowchart of a method 500, according to example embodiments. Method 700 presents an embodiment of a method that could be used with systems 100, 290, 300, 400, and/or device 200, for example. Method 500 may include one or more operations, functions, or actions as illustrated by one or more of blocks 502-508. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 500 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for method 500 and other processes and methods disclosed herein, each block in FIG. 5 may represent circuitry that is wired to perform the specific logical functions in the process.

At block 502, method 500 involves receiving light (e.g., light 104) at a first waveguide (e.g., waveguide 150) that defines a first optical path on a first substrate (e.g., substrate 186) of a plurality of substrates (e.g., substrates 184 and 186) that are in an overlapping arrangement. At block 504, method 500 involves guiding, inside the first waveguide, the light along the first optical path toward an output section of the first waveguide. At block 506, method 500 involves transmitting at the output section, the light out of the first waveguide toward a second substrate (e.g., substrate 184) of the plurality of substrates. At block 508, method 500 involves receiving, at an input section of a second waveguide (e.g., waveguide 151) disposed on the second substrate, the light transmitted from the output section of the first waveguide (e.g., waveguide 150). At block 510, method 500 involves guiding, inside the second waveguide, the light along a second optical path defined by the second waveguide on the second substrate.

IV. CONCLUSION

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

What is claimed:

1. A system comprising:
   a plurality of substrates disposed in an overlapping arrangement, the plurality of substrates including at least a first substrate and a second substrate;
   a light emitter configured to emit a light signal;
   a first waveguide disposed on the first substrate to define a first optical path on the first substrate, wherein the first waveguide is configured to guide the light signal along the first optical path and to transmit, at an output section of the first waveguide, the light signal out of the first waveguide toward the second substrate;
   a second waveguide disposed on the second substrate to define a second optical path on the second substrate, wherein an input section of the second waveguide overlaps the output section of the first waveguide, and wherein the second waveguide is configured to receive the light signal from the first waveguide at the input section and to guide the light signal along the second optical path and to transmit, at an output section of the second waveguide, the light signal out of the second waveguide through the second substrate; and
   a third waveguide disposed on the second substrate to define a third optical path on the second substrate, wherein the third waveguide is configured to receive, at an input section of the third waveguide, the light signal from the second waveguide through the second substrate and to guide the light signal along the third optical path.

2. The system of claim 1, wherein adjacent substrates in the overlapping arrangement are spaced apart by at least a given separation distance.

3. The system of claim 1, wherein the input section of the third waveguide overlaps the output section of the second waveguide.

4. The system of claim 1, wherein the first waveguide is located between the first substrate and the second substrate.

5. The system of claim 4, wherein the second waveguide is located between the first substrate and the second substrate.

6. The system of claim 1, further comprising:
   an optical material disposed between the output section of the first waveguide and the input section of the second waveguide, wherein the first waveguide has a first refractive index that is within a threshold to a second refractive index of the optical material.

7. The system of claim 6, wherein the optical material comprises an optical adhesive physically coupled to the input section and the output section.

8. The system of claim 1,
   wherein the first waveguide is configured to receive the light signal emitted from the light emitter at a first end of the first waveguide and to guide the light signal received at the first end toward a second end of the first waveguide, wherein the first waveguide has a first side between the first end and the second end, and wherein the first side is disposed on the first substrate.

9. The system of claim 8, wherein the light signal transmitted by the first waveguide at the output section is transmitted through a second side of the first waveguide opposite the first side.

10. The system of claim 8, further comprising:
    a mirror configured to reflect, at the output section of the first waveguide, the light signal guided inside the first waveguide toward the second side of the first waveguide,
    wherein the reflected light signal propagates, after being reflected by the mirror, out of the second side and toward the second substrate.

11. The system of claim 10, wherein the first waveguide has a tilted edge that is tilted toward the second side of the first waveguide, and wherein the mirror is disposed on the tilted edge.

12. The system of claim 11, wherein an angle between the tilted edge and the second side of the first waveguide is an acute angle.

13. The system of claim 8, wherein the output section of the first waveguide is at the second end of the first waveguide.

14. The system of claim 1, wherein at least a portion of the light signal received from the first waveguide at the input section of the second waveguide propagates out of the second waveguide toward the second substrate, and further comprising:
    a mirror configured to reflect the at least portion of the light signal back into the second waveguide.

15. The system of claim 1, wherein the second substrate has a first surface and a second surface opposite the first surface, wherein the third waveguide is disposed on the first surface of the second substrate, and wherein the second waveguide is disposed on the second surface of the second substrate.

16. The system of claim 1, further comprising:
    a fourth waveguide disposed on the first substrate to define a fourth optical path on the first substrate, wherein the fourth optical path does not intersect the first optical path.

17. The system of claim 16, wherein a first section of the fourth waveguide overlaps a second section of the second waveguide.

18. The system of claim 17, further comprising an optical shield positioned between the first section of the fourth waveguide and the second section of the second waveguide.

19. The system of claim 18, wherein the optical shield comprises a metal coating layer disposed on at least one of the first section of the fourth waveguide or the second section of the second waveguide.

20. A system comprising:
    a plurality of substrates disposed in an overlapping arrangement, the plurality of substrates including at least a first substrate and a second substrate;

an opaque material that includes a plurality of apertures, the plurality of apertures including at least a first aperture and a second aperture;

a first light emitter configured to emit a first light signal;

a second light emitter configured to emit a second light signal;

a first waveguide disposed on the first substrate to define a first optical path on the first substrate, wherein the first waveguide is configured to guide the first light signal along the first optical path and to transmit, at an output section of the first waveguide, the first light signal out of the first waveguide toward the second substrate;

a second waveguide disposed on the second substrate to define a second optical path on the second substrate, wherein an input section of the second waveguide is aligned with the output section of the first waveguide to receive the first light signal transmitted by the first waveguide toward the second substrate, wherein the second waveguide is configured to guide the first light signal received at the input section along the second optical path, and wherein the second waveguide is configured to transmit the first light signal out of the second waveguide toward the first aperture; and a third waveguide disposed on the second substrate to define a third optical path on the second substrate, wherein the third waveguide is configured to guide the second light signal along the third optical path and to transmit the second light signal out of the third waveguide toward the second aperture.

21. The system of claim 20, further comprising:

a fourth waveguide disposed on the first substrate to define a fourth optical path on the first substrate, wherein the fourth waveguide is configured to guide the second light signal along the fourth optical path and to transmit, at an output section of the fourth waveguide, the second light signal out of the fourth waveguide toward the second substrate.

22. A method comprising:

receiving light at a first waveguide that defines a first optical path on a first substrate of a plurality of substrates disposed in an overlapping arrangement;

guiding, inside the first waveguide, the light along the first optical path toward an output section of the first waveguide;

transmitting, at the output section of the first waveguide, the light out of the first waveguide toward a second substrate of the plurality of substrates;

receiving, at an input section of a second waveguide disposed on the second substrate, the light transmitted from the output section of the first waveguide, wherein the second waveguide defines a second optical path on the second substrate, and wherein the input section of the second waveguide is aligned with the output section of the first waveguide;

guiding, inside the second waveguide, the light along the second optical path toward an output section of the second waveguide;

transmitting, at the output section of the second waveguide, the light out of the second waveguide through the second substrate; and receiving, at an input section of a third waveguide disposed on the second substrate, the light transmitted from the output section of the second waveguide, wherein the third waveguide defines a third optical path on the second substrate.

23. The method of claim 22, further comprising:

guiding, inside the third waveguide, the light along the third optical path toward an output section of the first waveguide.

* * * * *